Figure 1:
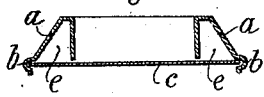

No. 687,151. Patented Nov. 19, 1901.
L. A. GARCHEY.
APPARATUS FOR THE MANUFACTURE OF ARTIFICIAL STONE.
(Application filed June 25, 1901.)
(No Model.) 2 Sheets—Sheet 1.

Witnesses.
N. L. Bogan
Robert Emett

Inventor.
Louis A. Garchey
By James L. Norris
Atty

No. 687,151. Patented Nov. 19, 1901.
L. A. GARCHEY.
APPARATUS FOR THE MANUFACTURE OF ARTIFICIAL STONE.
(Application filed June 25, 1901.)
(No Model.) 2 Sheets—Sheet 2.

Witnesses,
Inventor:
Louis A. Garchey
By James L. Norris
Atty.

UNITED STATES PATENT OFFICE.

LOUIS ANTOINE GARCHEY, OF PARIS, FRANCE.

APPARATUS FOR THE MANUFACTURE OF ARTIFICIAL STONE.

SPECIFICATION forming part of Letters Patent No. 687,151, dated November 19, 1901.

Original application filed April 24, 1900, Serial No. 14,149. Divided and this application filed June 25, 1901. Serial No. 66,005.

(No model.)

*To all whom it may concern:*

Be it known that I, LOUIS ANTOINE GARCHEY, a citizen of France, residing at 72 Boulevard Haussman, Paris, France, have invented certain new and useful Improvements in Apparatus for the Manufacture of Artificial Stone, of which the following is a specification.

This invention has for its object to devise an apparatus especially adapted for carrying out the process for the manufacture of artificial stone set forth in my application, Serial No. 14,149, filed April 24, 1900, and is a division of said application.

The process set forth in application Serial No. 14,149 and used in connection with the apparatus disclosed in the specification is as follows: The workman has near to him a certain number of boxes or troughs—three, for example—filled with pulverized glass of different grades, obtained by passing the broken glass coming from the crushers through a suitable sorter. The operator spreads a layer of the largest-graded glass on the bottom of the mold. Over this he distributes a layer of intermediate grade and then finishes with a top layer of the finest glass, so as to form the facing of the tile or brick. The mold that I employ is a mold of refractory sand, which does not have any one of the inconveniences of molds of metal or of refractory earth, since the same sand can be utilized over again indefinitely. I dispose the sand on a movable support or tray of refractory earth, which remains permanently in the devitrifying-furnace and which is only withdrawn therefrom so that the next tile or brick which is to be made may be placed thereon. This manipulation should be made very quickly, so that the supports or trays do not remain too long out of the furnace and are not damaged. So I have been led to contrive a device enabling the workman to quickly place on the incandescent support or tray the mold of sand and the pulverized glass. To this end I use an auxiliary sheet-iron mold of suitable form, designed to receive and to convey the sand that constitutes the main mold, and at the same time the material which is to be subjected in its mold, to the action of the furnace. I arrange suitably the sand and the pulverized glass in this auxiliary sheet-iron mold, and then it suffices to transport the whole on the incandescent support or tray and to remove the sheet-iron mold. This latter is never exposed to the heat of the furnace, since it only rests upon the hot support or tray for a very short time.

In order that my invention may be readily understood, I will describe the same with reference to the annexed drawings, in which—

Figure 3:
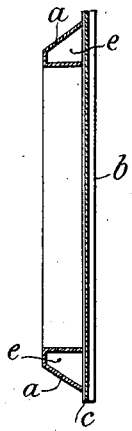
Figure 2:
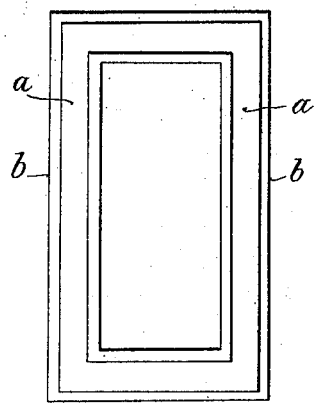
Figure 6:
Figure 7:
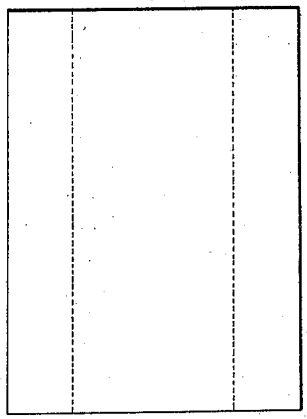
Figure 4:
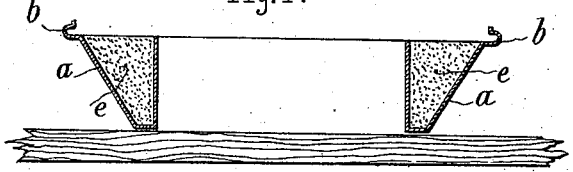
Figure 5:
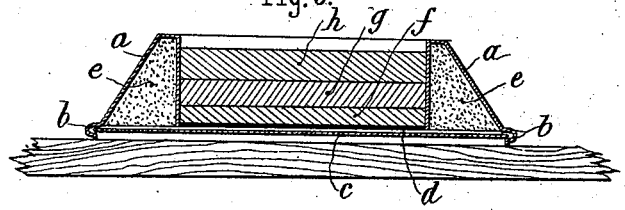
Figure 8:
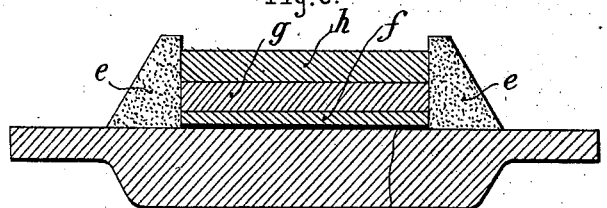
Figure 10:
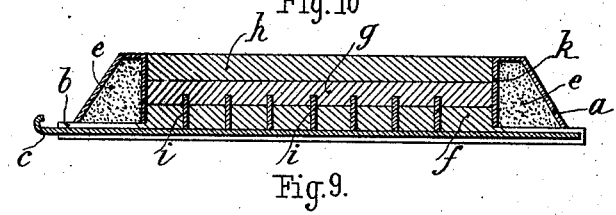
Figure 9:
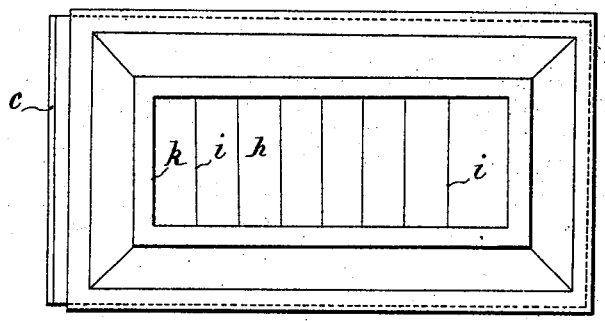

Figures 1, 2, and 3 represent my auxiliary sheet-iron mold. Figs. 4 and 5 show the manner of using it. Figs. 6 and 7 represent a removable support or tray. Fig. 8 represents the support or tray after removal of the iron mold. Figs. 9 and 10 represent a modification in the construction of the mold.

I employ an auxiliary sheet-iron mold, the sides $a$ of which are double-walled—that is to say, they form a space or hollow frame $e$ around the mold. The outer edges of the sides of this mold are provided with a groove $b$, in which a plate $c$, forming a movable bottom, is free to slide. The inner part $k$ of the double wall is perpendicular to the plane of the bottom of the mold, so as to permit removal of the mold from its contents by simply raising it. This mold is never exposed to the heat of the furnace. It serves only for the ready preparation of the sand mold, which accompanies the glass into the furnace and after the devitrification is again utilized repeatedly. Besides this the said sheet-iron mold serves effectively for the molding of the artificial stone, as I am about to explain. To this end the mold is first arranged on a table, as shown in Fig. 4. The hollow space $e$ is then filled with sand, and the movable bottom $c$ is placed in position. The mold is then turned over, so as to bring it into the position shown in Fig. 5. The sliding bottom $c$ is covered with a sheet of paper $d$, and the molding is then proceeded with. For this purpose, and as it has been described in my application Serial No. 14,149, the workman spreads a layer $f$ of the largest-graded glass on the bottom of the mold. Over this he distributes a layer $g$ of intermediate grade and then finishes with a top layer $h$ of the finest glass, so as to form the facing of the artificial stone. The mold being thus prepared an operator places the same on an incandescent support or tray, such as is represented in Figs. 6, 7, and 8, after which he withdraws the sliding bottom c. The sheet of paper d, interposed between the plate c and the molded glass, prevents this latter from being carried away with the plate. Lastly, the workman raises and removes the sheet-iron mold a and hands it over to the molder. The sand edging and the molded layer of glass are thus left arranged upon the incandescent support or tray, (see Fig. 8,) which is immediately put back into the furnace.

In the modified arrangement shown in Figs. 9 and 10 the mold is provided with transverse partitions, such as i, placed a few centimeters apart and intended to keep the crushed glass f in place when the sliding bottom c is withdrawn, so dispensing with the use of the paper sheet d.

Having thus described my invention, what I claim as new, and desire to secure by Letters Patent, is—

1. In an apparatus for manufacturing artificial stone, a mold having inner and outer walls, two of said outer walls formed with grooves, and a plate forming a bottom and adapted to engage in the grooves of the outer walls.

2. In an apparatus for manufacturing artificial stone, a mold having inner and outer walls with a sand-chamber formed between the said walls, a movable bottom for the said mold and sand-chamber, and means adapted to be mounted upon the bottom for preventing the material when placed in the mold from being distributed when the said bottom is removed.

3. In an apparatus for manufacturing artificial stone, in combination, a mold having inner and outer walls forming a sand-chamber between them, a movable bottom for the said mold, a sheet of paper mounted upon the bottom, and an incandescent support.

4. In an apparatus for manufacturing artificial stone, a mold having a vertically-extending inner wall, and an outer wall arranged at an inclination and provided with grooves, and a movable bottom for the said mold adapted to engage in the grooves of the outer wall.

5. In an apparatus for manufacturing artificial stone, a mold having a vertically-extending inner wall, and an outer wall provided with grooves extending at an inclination and connected at its upper end with the top of the vertical wall forming a closure, the said walls forming a sand-chamber open at the bottom, and a movable bottom for the said mold and sand-chamber adapted to engage in the grooves of the outer wall.

In testimony whereof I have hereunto set my hand in presence of two subscribing witnesses.

LOUIS ANTOINE GARCHEY.

Witnesses:
EDWARD P. MACLEAN,
ALFRED FREY.